Patented Oct. 26, 1954

2,692,904

UNITED STATES PATENT OFFICE 2,692,904

GROWTH INHIBITER FOR BATTERY ELECTRODES

Howard J. Strauss, Philadelphia, Pa., assignor to The Electric Storage Battery Company, a corporation of New Jersey No Drawing. Application December 28, 1951, Serial No. 263,999

4 Claims. (Cl. 136—30)

This invention relates to secondary or storage batteries having negative electrodes of the type which have heretofore been subject to growth of surface projections during operation and has for an object the reduction in the rate of growth of surface projections with a resulting increase in the life of the battery.

Although similar growth phenomena will occur in electrode systems of other types and using different metallic couples such as, for example, nickel-zinc and nickel-cadmium, particularly in a silver-zinc secondary battery having an alkaline electrolyte, the negative active material in crystalline form may appear as growing protuberances over the face of the zinc negative electrode, such protuberances eventually piercing the diaphragm separating the zinc electrode and the associated silver positive electrode.

It is to be understood that the electrodes of opposite polarity are disposed closely adjacent each other. Any projections from the face of one electrode, therefore, tend to produce zones of low electrical resistance and high current density which, in turn, tend to enhance the growth of the projections. As a result of growth, these projections will not only eventually perforate the interposed separator or diaphragm but may extend to an adjacent plate of opposite polarity to form a low resistance path therebetween, in effect a "short circuit" of the cell.

In carrying out the present invention in one form thereof, there is intimately mixed with the active material of the negative plates, which in the foregoing illustration may be zinc oxide, a material in colloid form which has the property of inhibiting growth of such projections from the face of the plate. Such a colloid may comprise gum arabic, gum tragacanth, gum karaya, and colloids selected from the group consisting of starch, licorice, glue, lignin, and glues of animal origin. These colloids are of high molecular weight and are dispersible in the strong alkaline solutions which are used as electrolyte in batteries of the type described above. It has been found that mixing a colloid of the foregoing type with the active material of the negative plate tends to inhibit the growth of projections that would otherwise occur thereon. The result is a material lengthening of the life of the battery. The colloid, such as gum arabic or starch, may be added to the zinc oxide in proportion of two per cent or less by weight of colloid to that of zinc oxide. After mixing the colloid with the zinc oxide, the combination is pasted in the usual manner upon a suitable grid. Though other phenomena may contribute to the longer life of the battery, it is believed that the following explanation is valid.

During the charging of a battery the zinc oxide is converted to metallic zinc, the chemical reduction first occurring at the surface of the grid and gradually progressing outwardly therefrom. The plate as a whole, when first pasted and immersed in a strong alkaline electrolyte, such as potassium hydroxide that may be saturated with zinc oxide, is of a cellular or porous character. An irregularity on the surface of the grid resulting in a region of lowered electrical resistance will cause the current density in that zone to be higher than in adjacent zones. A concentration of current in a localized area tends to increase the rate of conversion of the zinc oxide to zinc in such area. The metallic zinc in many cases in such an area is composed of large, hard crystals that are not completely converted to zinc oxide on subsequent discharge. Since the large zinc crystals are more electrically conductive than the surrounding particles of zinc oxide, the charge current tends to build up in that area. It will be understood that, during discharge, some zinc will become dissolved in the electrolyte. During subsequent recharge, this zinc will be plated out on the negative plate largely in the areas of greatest current concentration; i. e., on the large crystals of zinc, thus continually building up projections in those areas. These projections will eventually, after several cycles of charge and discharge, pierce the dividing diaphragm or separator and may even make direct contact with the associated positive plate, thus short circuiting the cell.

In accordance with the present invention, however, a region of lowered electrical resistance or of increased current density within the negative plate itself produces migration of the colloid into the region. As the colloid concentration increases the electrical resistance is increased and the current density is decreased. Thus, the presence of the colloid within the plate itself and the migration thereof under the influence of changing current distribution produces a regulating action upon the current, making it more uniform throughout the area of the plate. The colloid redistributes itself throughout the plate with concentrations thereof increased in all zones or areas where the current tends to be greater than in adjacent zones or areas.

It is emphasized that during charging of the battery the growth of the crystalline structure appears to begin at the surface of the grid on which the active material is pasted. By premixing the colloid with the active material, it is made available at the very zone or area in which an undesired crystalline growth may start to build up. By incorporating the colloid in the active material itself the colloid is mechanically entrapped therein, and does not readily disperse outwardly of the plate into the free electrolyte due to the mechanical impedance to movement away from the surface of the plate. Thus, there is minimized or avoided the presence of the colloid in the free electrolyte and there is avoided the clogging of the pores of the diaphragm or separator by such colloid which would increase the internal resistance of the cell. Thus, while the colloid is present within the plate, it does not vary or change the internal resistance of the battery as a whole even during repeated charging and discharging thereof.

The extent in which battery life has been lengthened by the present invention is indicated by the tests under the following conditions: Each cell was charged at a constant current of five amperes for a period of about 2.6 hours, or a total charge of thirteen ampere hours. After an open circuit stand of from one to two hours following the charge each cell was discharged at the rate of 120 amperes for a period of five minutes. If, at the end of that period the voltage was one volt or above, the cell was considered suitable for the next cycle. The foregoing procedure was continued until the voltage decreased below one volt at the end of five minutes, at which point the cell was not considered suitable for further service.

When tested according to the foregoing procedure, cells not including the present invention gave a cycle life of from eight to ten cycles. Utilizing the same experimental technique, cells including a colloid dispersed throughout the active material of the negative plate as described above gave cycle lives of from fourteen to sixteen cycles, and, in some instances, as high as twenty cycles. From the foregoing tests it will be seen that the cycle life of the battery has been greatly increased as a result of the present invention.

What is claimed is:

1. A battery electrode comprising a grid carrying active material consisting of zinc oxide throughout which there is intimately mixed a colloid consisting of gum arabic in proportion not exceeding about two per cent by weight of the zinc oxide.

2. A battery electrode comprising a grid carrying active material consisting of zinc oxide throughout which there is intimately mixed a colloid consisting of starch in proportion not exceeding about two per cent by weight of the zinc oxide.

3. A battery electrode comprising a grid carrying active material consisting of zinc oxide throughout which there is intimately mixed a colloid selected from the group consisting of gum arabic, gum tragacanth, gum karaya, starch, licorice, lignin and glues of animal origin in proportion not exceeding about two per cent by weight of colloids with respect to the weight of zinc oxide.

4. A battery electrode comprising a grid carrying active material consisting of zinc oxide throughout which there is intimately mixed a colloid selected from the group consisting of gum arabic, gum tragacanth, gum karaya, starch, licorice, lignin and glues of animal origin in proportion not exceeding about two per cent by weight of colloids with respect to the weight of active material.

References Cited in the file of this patent

UNITED STATES PATENTS

| Number | Name | Date |
|---|---|---|
| 396,369 | Roberts | Jan. 15, 1889 |
| 489,315 | Michel | Jan. 3, 1893 |
| 623,195 | Werner | Apr. 18, 1899 |
| 1,505,990 | Willard | Aug. 26, 1924 |